United States Patent
Park

(10) Patent No.: US 10,824,128 B2
(45) Date of Patent: Nov. 3, 2020

(54) DEVICE FOR PROCESSING PROGRAMMABLE LOGIC CONTROLLER PROGRAM

(71) Applicant: LSIS CO., LTD., Anyang-si (KR)

(72) Inventor: Jo-Dong Park, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 69 days.

(21) Appl. No.: 16/223,316

(22) Filed: Dec. 18, 2018

(65) Prior Publication Data

US 2019/0339663 A1 Nov. 7, 2019

(30) Foreign Application Priority Data

May 3, 2018 (KR) .................. 10-2018-0051265

(51) Int. Cl.
*G06F 9/44* (2018.01)
*G05B 19/05* (2006.01)

(52) U.S. Cl.
CPC .... *G05B 19/05* (2013.01); *G05B 2219/13114* (2013.01)

(58) Field of Classification Search
None
See application file for complete search history.

(56) References Cited

U.S. PATENT DOCUMENTS

| | | | | |
|---|---|---|---|---|
| 2012/0117029 A1* | 5/2012 | Gold | .................. | G06F 11/1451 707/651 |
| 2015/0331407 A1* | 11/2015 | Lee | ...................... | G05B 19/056 700/86 |

FOREIGN PATENT DOCUMENTS

| | | |
|---|---|---|
| CN | 103593321 B | 5/2016 |
| JP | S63177205 A | 7/1988 |
| JP | 2001142510 A | 5/2001 |
| JP | 2006202233 A | 8/2006 |
| JP | 2013205933 A | 10/2013 |
| KR | 20130104453 A | 9/2013 |
| KR | 101771289 B1 | 8/2017 |

OTHER PUBLICATIONS

Japanese Office Action for related Japanese Application No. 2018-235819; action dated Dec. 24, 2019; (4 pages).
European Search Report for related European Application No. 18214261.2; action dated Jul. 2, 2019; (7 pages).

* cited by examiner

*Primary Examiner* — Anna C Deng
(74) *Attorney, Agent, or Firm* — K&L Gates LLP

(57) ABSTRACT

The present disclosure provides a device for processing a programmable logic controller (PLC) program. In one embodiment, the device includes a storage containing PLC programs stored on a block basis, and a program block table defining storage locations of the PLC programs; and a controller configured: when a PLC program is modified during a PLC is operating, to determine a start address of a storage location where the modified PLC program is to be stored with referring to a block number of the modified PLC program, size information of the modified PLC program, and the program block table; and to store the modified PLC program in the storage based on the determined start address. According to the present disclosure, multiple users may simultaneously access a PLC and then may simultaneously modify PLC programs during the PLC is operating.

7 Claims, 7 Drawing Sheets

FIG. 3

| Program type | Block number | Storage location of program | |
|---|---|---|---|
| Initialization | 1 | Start address | 0x0000 |
| | | End address | 0x00FF |
| | 2 | Start address | 0x0100 |
| | | End address | 0x01FF |
| | 3···.5 | ......... | 0x0200~0x0FFF |
| Scan | 6 | Start address | 0x1000 |
| | | End address | 0x10FF |
| | 7 | Start address | 0x1100 |
| | | End address | 0x11FF |
| | 8···9 | ......... | 0x1200~0x300F |
| Interrupt | 10 | Start address | 0x3010 |
| | | End address | 0x310F |
| | 11 | Start address | 0x3110 |
| | | End address | 0x34FF |
| | 12···14 | ......... | 0x3500~0x37FF |

FIG. 4

| Program type | Block number | Storage location of program | |
|---|---|---|---|
| Initialization | 1 | Start address | 0x0000 |
| | | End address | 0x00FF |
| | 2 | Start address | 0x0100 |
| | | End address | 0x01FF |
| | 3···.5 | ········ | 0x0200~0x0FFF |
| Scan | 6 | Start address | 0x1000 |
| | | End address | 0x12FF |
| | 7 | Start address | 0x1300 |
| | | End address | 0x13FF |
| | 8···9 | ········ | 0x1400~0x320F |
| Interrupt | 10 | Start address | 0x3210 |
| | | End address | 0x330F |
| | 11 | Start address | 0x3310 |
| | | End address | 0x36FF |
| | 12···14 | ········ | 0x3700~0x39FF |

FIG. 6

| Program type | Block number | Size of program |
|---|---|---|
| Initialization | 1 | 0x0000 |
| | 2 | 0x0100 |
| | 3…5 | 0x0E00 |
| Scan | 6 | 0x0100 |
| | 7 | 0x0100 |
| | 8…9 | 0x1E10 |
| Interrupt | 10 | 0x0100 |
| | 11 | 0x03E0 |
| | 12…14 | 0x0030 |

FIG. 7

| Program type | Block number | Size of program |
|---|---|---|
| Initialization | 1 | 0x0000 |
| | 2 | 0x0100 |
| | 3···.5 | 0x0E00 |
| Scan | 6 | 0x0200 |
| | 7 | 0x0100 |
| | 8···9 | 0x1E10 |
| Interrupt | 10 | 0x0150 |
| | 11 | 0x03E0 |
| | 12···14 | 0x0030 |

DEVICE FOR PROCESSING PROGRAMMABLE LOGIC CONTROLLER PROGRAM

CROSS-REFERENCE TO RELATED APPLICATIONS

Pursuant to 35 U.S.C. § 119(a), this application claims the benefit of earlier filing date and right of priority to Korean Application No. 10-2018-0051265 filed on May 3, 2018, the disclosure of which is incorporated herein by reference in its entirety.

BACKGROUND

1. Technical Field

The present disclosure relates to a Programmable Logic Controller (PLC) program processing device.

2. Description of the Related Art

In industrial factory automation systems, an integrated control device such as a PLC is employed.

The PLC includes PLC programs such as an initialization program, a scan program, and an interrupt program for controlling various devices. Such PLC programs are created or modified by a dedicated application such as a Programming and Debugging Tool (PADT) installed in a client device such as a Personal Computer (PC).

FIG. 1 is a flow chart illustrating a processing of a typical PLC program.

When an operation of the PLC starts, initialization is first performed in the PLC 102. The initialization includes hardware initialization of Main Processing Unit (MPU) or other module embedded in the PLC, and software initialization of variables for PLC program execution.

Next, a refresh is performed for an input image region 104. When PLC operation starts, data input via an input module is input into an input region of a storage unit such as a memory. The data is again copied into an input image region, where the data are used as input data while an operation is being performed. The operation in which the data in the input region is copied to the input image region is called an input refresh.

Next, the PLC determines whether the previously performed initialization has been completed 106. When from the determination result, the initialization is not completed, the PLC performs initialization by performing a pre-stored initialization program 108. When, from the determination result, the initialization is completed, the PLC performs a pre-stored scan program 110. When an interrupt signal is issued during the execution of the scan program, the PLC stops the execution of the scan program. The PLC executes a pre-stored interrupt program 112 and resumes the scan program 110.

When the initialization program or scan program is completed, a refresh is performed on an output image region 114. Output refresh refers to an operation in which data derived by the initialization program or scan program is copied to the output image region. When the output image region has been refreshed, the PLC returns to the refresh operation 104 of the input image region, where the above-described process is repeatedly performed.

According to the prior art, when the PLC is in operation, the user may connect to the PLC via a client device such as a PC and may modify the PLC (program initialization program, scan program, interrupt program, etc.) stored in the PLC. The function of modifying the PLC program when the PLC is in operation is called modification-during-running (MDR).

FIG. 2 is a flow chart showing the modification-during-running (MDR) process performed during the PLC operation.

When the PLC is running, the user executes an application for PLC program modification such as PADT installed on the client device to open a new project file for the PLC program modification. The user connects to the PLC using a communication function between the client device and the PLC. The connection allows the application for the PLC program modification to initiate the modification-during-running (MDR) function. The PLC performs a monitoring function to check whether the program has been modified 208.

The user modifies a target PLC program using an application for the PLC program modification 210. When the modification is completed, the modified PLC program is transmitted to the PLC. The PLC stores the modified PLC program in the storage and updates an existing PLC program 212. This ends the modification-during-running (MDR) function.

FIG. 3 shows a program block table according to the prior art. Further, FIG. 4 shows a update result of a program block table by the modification-during-running (MDR) of the PLC program.

To perform the above-described modification-during-running (MDR) function, the application for PLC program modification refers to the program block table as shown in FIG. 3. According to the related art, the program block table is composed of data for defining a storage location of each program stored in the PLC's storage. For example, the table may include types of PLC programs (e.g., initialization/scan/interrupt programs), a block number of each PLC program (e.g., 1, 2, . . . , 14), and a start address and an end address of each PLC program storage location (e.g., 0x0000, 0x00FF).

According to the related art, the application for the PLC program modification uses a program block table as shown in FIG. 3 to identify a start address (0x1000) and an end address (0x10FF) corresponding to a block number (for example, 6) of a target PLC program to be modified by the user. Then, the application downloads the PLC program corresponding to the identified addresses to the client device. In this connection, the start address and the end address indicate a physical location at which the program of the block #6 is stored in the storage.

When the PLC program modification is completed, the application for the PLC program modification sends to the PLC, the modified PLC program, which the user has modified via the modification-during-running (MDR) process, and, at the same time, the application updates the program block table to correspond to the modified PLC program.

For example, when, during the PLC operation, the user has modified the scan program stored in the block #6 of the PLC's storage such that a size of the scan program is increased by 0x200 bytes, the application program for the PLC program modification updates the end address of the block #6 by 0x200 to update the end address to 0x12FF.

As the end address of the block #6 increases by 0x200, the start and end addresses of the blocks having block numbers larger than #6 blocks, that is, blocks #7 to #14, are increased by 0x200. When the modification-during-running (MDR) is completed, the PLC again stores the pre-backed programs of the blocks #7 to #14 in the storage locations corresponding to the newly changed start addresses and end addresses as shown in FIG. 4.

However, according to the above-mentioned prior art, several users may access the same PLC at the same time and each user may modify the PLC program. For example, a first user and a second user simultaneously access the PLC. The first user and the second user refer to the program block table as shown in FIG. 3 and modify PLC programs of different blocks respectively. In this connection, the PLC program modification by the first user is completed in an earlier time than PLC program modification by the second user. Thus, the program block table is updated as shown in FIG. 4 in accordance with the PLC program modification by the first user. However, the PLC program modified by the second user may be stored in an incorrect location due to referring to the existing program block table as shown in FIG. 3.

In order to prevent such a situation, in the prior art, when a plurality of users request modification of the PLC programs, only after the PLC program modification by one user and the corresponding program block table update are completed, other users may modify the PLC programs.

As a result, according to the prior art, it is impossible for various users to access simultaneously the PLC and simultaneously modify the PLC programs during the operation of the PLC.

SUMMARY

The present disclosure aims to provide a PLC program processing device that allows multiple users to simultaneously access a PLC and then simultaneously modify PLC programs during the PLC is operating.

The purposes of the present disclosure are not limited to the above-mentioned purposes. Other purposes and advantages of the present disclosure, as not mentioned above, may be understood from the following descriptions and more clearly understood from the embodiments of the present disclosure. Further, it will be readily appreciated that the objects and advantages of the present disclosure may be realized by features and combinations thereof as disclosed in the claims.

In one aspect of the present disclosure, there is provided a device for processing a programmable logic controller (PLC) program, the device comprising: a storage containing PLC programs stored on a block basis, and a program block table defining storage locations of the PLC programs; and a controller configured: when a PLC program is modified during a PLC is operating, to determine a start address of a storage location where the modified PLC program is to be stored with referring to a block number of the modified PLC program, size information of the modified PLC program, and the program block table; and to store the modified PLC program in the storage based on the determined start address.

In one embodiment, the program block table may include a block number corresponding to each PLC program and size information of each PLC program.

In one embodiment, the start address of the storage location where the modified PLC program is to be stored may be determined by summing sizes of all of PLC programs stored in previous blocks to the modified PLC program block.

In one embodiment, when the controller receives the modified PLC program, the controller may be configured to back up PLC programs having block numbers greater than a block number of the modified PLC program, wherein after the modified PLC program has been stored, the controller is configured to re-store the backed-up PLC programs in the storage based on a start address of a next block to the modified PLC program block.

In one embodiment, the start address of the next block to the modified PLC program may be determined by increasing the start address of the storage location where the modified PLC program is to be stored by a size of the modified PLC program.

In one embodiment, the modified PLC program includes first and second modified PLC programs, wherein a block number of the first modified PLC program is greater than a block number of the second modified PLC program, wherein a start address of a storage location where the first modified PLC program is to be stored is determined by increasing a start address of a storage location where the second modified PLC program is to be stored, by a sum of sizes of PLC programs corresponding to block numbers between the block number of the second modified PLC program and the block number of the first modified PLC program.

In the PLC program processing device according to the present disclosure, multiple users may simultaneously access a PLC and then may simultaneously modify PLC programs during the PLC is operating.

Further specific effects of the present disclosure as well as the effects as described above will be described in conduction with illustrations of specific details for carrying out the invention.

BRIEF DESCRIPTION OF DRAWINGS

FIG. 3 shows a program block table according to the prior art.

FIG. 4 shows the program block table updated according to the modification-during-running (MDR) process of a PLC program.

FIG. 6 shows a configuration of a new program block table referenced in a PLC program processing according to one embodiment of the present disclosure.

FIG. 7 shows a program block table updated according to a modification-during-running (MDR) process of a PLC program according to the present disclosure.

DETAILED DESCRIPTION

Figure 1:
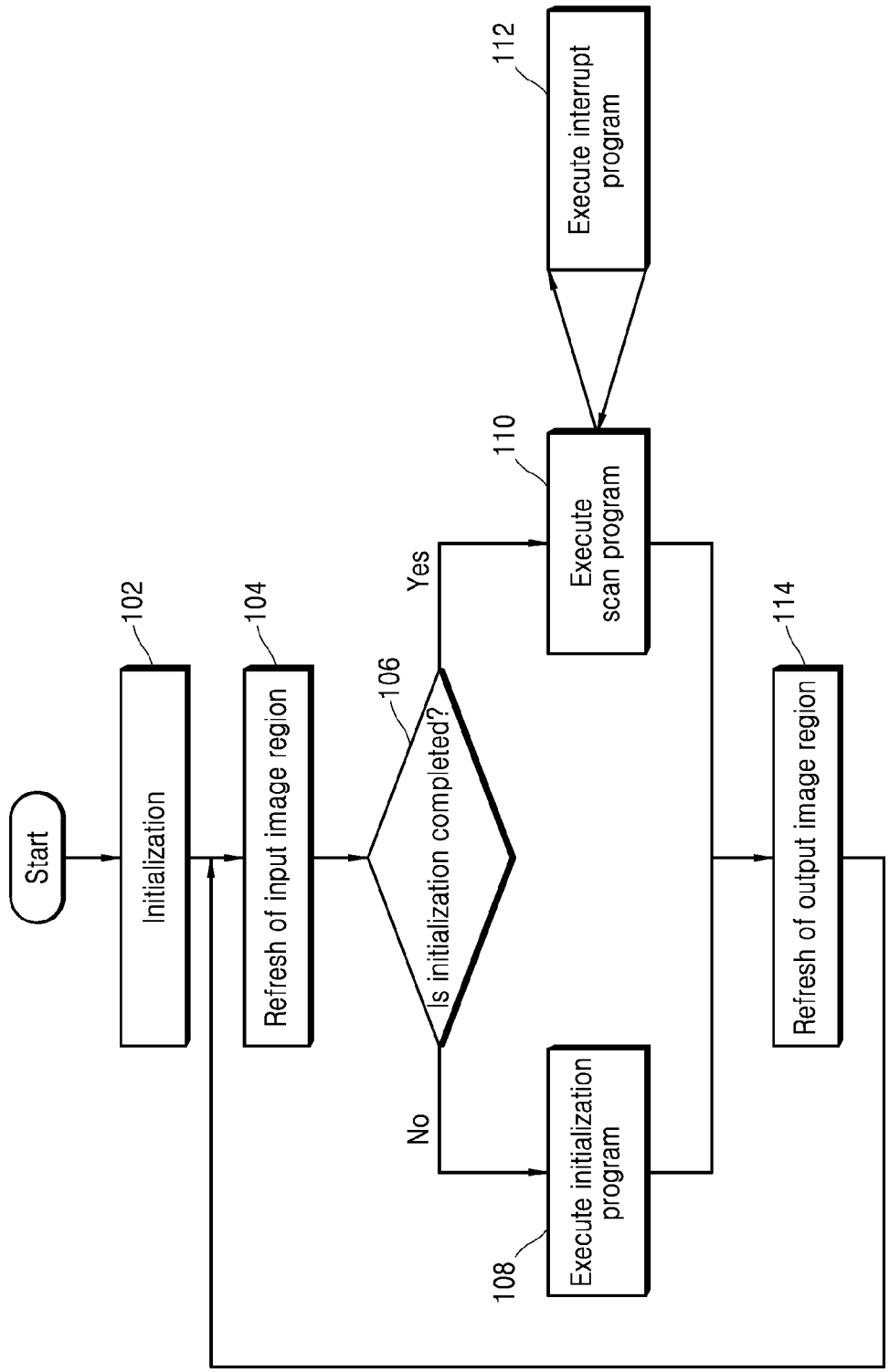
FIG. 1 is a flow chart illustrating a processing of a typical PLC program.
Figure 2:
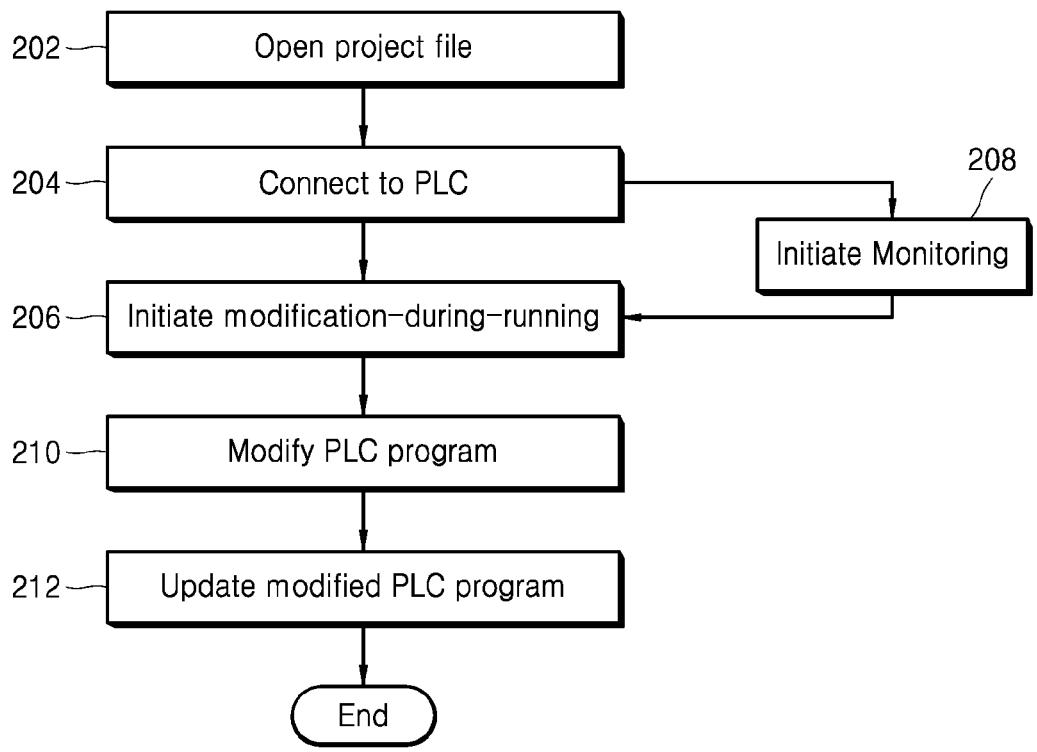
FIG. 2 is a flow chart showing a modification-during-running (MDR) process performed during PLC operation.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 5:
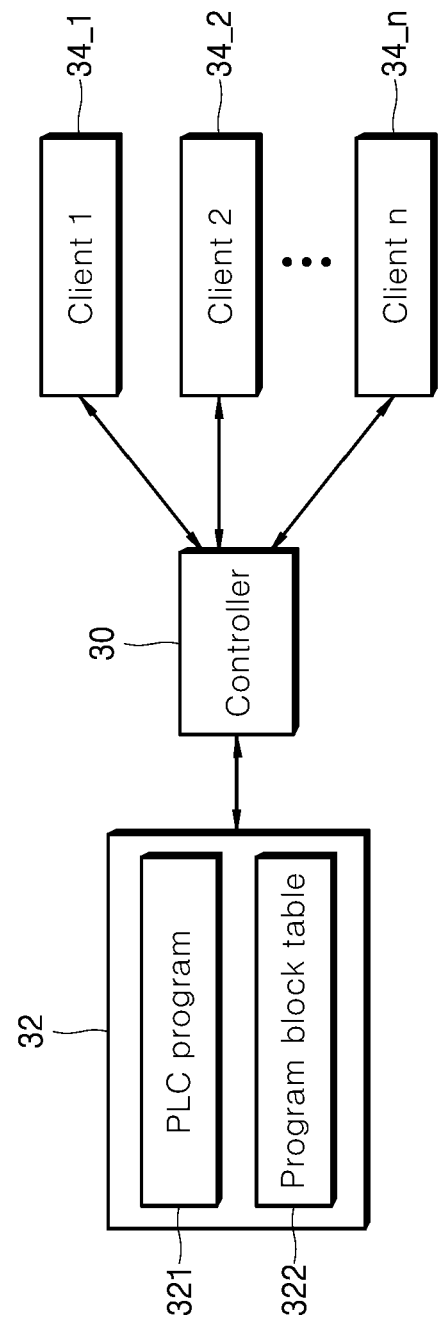
FIG. 5 shows a configuration of a PLC program processing device according to one embodiment of the present disclosure.

FIG. 5 shows a configuration of a PLC program processing device according to one embodiment of the present disclosure.

Referring to FIG. 5, a PLC program processing device according to one embodiment of the present disclosure includes a controller 30 and a storage 32.

The controller 30 executes a PLC program 312 stored in the storage 32 for operation of the PLC. In some embodiments, the controller 30 may include a compiler for translating the PLC program 312 stored in the storage 32 into a machine language or intermediate language.

The controller 30 may refer to a program block table 322 stored in the storage 32 to retrieve each PLC program 312 stored in the storage 32. The program block table 322 is configured for defining a storage location of each PLC program 312 stored in the storage 32. The program block table 322 according to the present disclosure has a new structure different from the conventional program block table as described above, and this novel structure will be described later.

Further, the controller 30 may transmit the PLC program 312 to be modified by the user to the client devices 34_1, 34_2, 34_n via communication with the client devices 34_1, 34_2, . . . , 34_n. In some embodiments, the client device 34_1, 34_2, 34_n directly refers to the program block table 322 stored in the storage 32 in response to the user's request of the modification of the PLC program, and then downloads the PLC program requested by the user from the table thereto.

Further, when the user has completed the modification of the PLC program, the controller 30 receives the modified PLC program, a block number of the modified PLC program, and size information of the modified PLC program from the client devices 34_1, 34_2, . . . , 34_n. The controller 30 updates the program block table 322 based on the block number of the modified PLC program and the size information of the modified PLC program.

Further, the controller 30 refers to the modified PLC program block number, the modified PLC program size information, and the updated program block table 322 to determine a start address of a storage location in which the PLC program modified by the user is to be stored.

In this connection, the start address of the storage location where the modified PLC program is to be stored is determined by summing sizes of all programs stored in previous blocks to the modified PLC program block. The controller 30 stores the modified PLC program in the storage 32 with reference to the determined start address.

In particular, when first and second PLC programs having first and second block numbers respectively where the first number is larger than the second number are modified at the same time, a start address of a storage location where the first modified PLC program is to be stored is determined by increasing the second number by a sum of sizes of PLC programs having block numbers between the first and second numbers.

Further, when the controller 30 receives the modified PLC program from the client devices 34_1, 34_2, 34_n, the controller 30 backs up a PLC program having a block number larger than that of the modified PLC program. After the modified PLC program has been stored, the controller stores the backed-up PLC program in the storage 32 with reference to a start address of a next block to the modified PLC program block.

In this connection, a start address of the next block to the modified PLC program block is determined by increasing the start address of the storage location where the modified PLC program is to be stored by a size of the modified PLC program.

Hereinafter, referring to FIGS. 5 to 7, a modification-during-running (MDR) function of a PLC program processing device according to one embodiment of the present disclosure is described.

FIG. 6 shows a configuration of a new program block table referenced in the PLC program processing according to one embodiment of the present disclosure. Further, FIG. 7 shows a result of a program block table updated by the modification-during-running (MDR) of the PLC program according to the present disclosure.

As shown in FIG. 6, the program block table stored in the PLC program processing device according to the present disclosure includes a type (e.g., initialization/scan/interrupt programs) of PLC programs stored in the storage 32, a block number (for example, #1 to #14) of each stored PLC program, and a size of the PLC program stored in each block (e.g., 0x0100). That is, unlike the prior art, the program block table according to the present disclosure does not include a start address and an end address of a location where each PLC program is stored. Rather, the table according to the present disclosure merely includes a size of a space occupied by each PLC program.

First, in a first embodiment, a process of modifying a scan program stored in a block #6 by a single user during operation of the PLC will be described.

When the user requests modification of the scan program stored in a location corresponding to a block #6 of the storage 32, the client device 34_1 receives a scan program stored in the block #6 of the storage 32 via the controller 30. At this time, the controller 30 determines a start address and an end address of the block #6 with reference to a size (0x0100) of the program corresponding to the block #6 recorded in the program block table as shown in FIG. 6. The controller 30 refers to the determined start address and end address to fetch the scan program corresponding to the block #6.

The controller 30 may sum sizes of all the programs stored in the previous blocks to the PLC program block subjected to modification request from the user to determine a start address of the block #6. For example, the controller 30 determines the start address of the block #6 by summing the sizes (0x0000, 0x0100, and 0x0E00) of the PLC programs stored in previous blocks to the block #6 of the scan program subjected to modification request from the user, that is, #1 to #5 blocks.

The controller 30 refers to the determined start address of the block #6 to fetch the scan program from the block #6 of the storage 32. The controller transmits the fetched scan program to the client device 34_1.

When the user completes the modification of the scan program stored in the location corresponding to block #6 of the storage 32 via the client device 34_1, the client device 34_1 transmits the modified scan program block number #6 and the modified scan program size (0x0200) to the controller 30 together with the modified scan program.

Upon receiving the modified scan program, the controller 30 updates the program size of the block #6 of the program block table to a size (0x0200), which is a size of the modified scan program, as shown in FIG. 7. The controller 30 then determines "a start address of the storage location where the modified scan program is to be stored" in order to store the modified scan program in the storage 32.

More specifically, the controller 30 sums the sizes of all programs stored in the previous blocks to the modified PLC program block to determine "the start address of the storage location where the modified scan program is to be stored".

For example, the controller 30 may sums the sizes (0x0000, 0x0100, and 0x0E00) of the PLC programs stored in the previous blocks to the #6 block as the modified scan program block, that is, the blocks #1 to #5 to determine the start address of the block #6 in which the modified scan program is to be stored.

The controller 30 stores the modified scan program in the storage 32 with reference to the thus determined start address.

In one example, when the controller 30 receives the modified PLC program from the client device 34_1, the controller 30 backs up PLC programs having block numbers greater than the block number of the modified PLC program. For example, the controller 30 stores each of the PLC programs stored in blocks #7 to #14 having block numbers greater than the #6 block, which is the modified scan program block, into the storage 32 or in a separate storage space other than the storage 32.

After backing up PLC programs stored in the blocks #7 to #14, and after the modified scan program as described above has been stored, the controller 30 refers to the start address of a block of a block number (block #7) next to the block number (block #6) of the modified scan program to sequentially stores the PLC programs of the backed-up #7 to #14 blocks in the storage 32.

In this connection, the controller 30 increments "the start address of the storage location in which the modified scan program determined above is to be stored", that is, the start address of the block #6 by the size (0x0200) of the modified scan program, to determine a start address of a next block to the modified PLC program block, that is, a start address of the block #7.

During the operation of the PLC, the modification-during-running (MDR) of the scan program stored in the block #6 has been completed.

Next, a process of simultaneously modifying the scan program stored in the #6 block and the interrupt program stored in the #10 block respectively by two users during the operation of the PLC will be described.

First, the controller 30 receives a modification request of the scan program stored in the block #6 from the client device 34_1, and, at the same time, the controller 30 receives a modification request of the interrupt program stored in the block #10 from the client device 34_2.

The controller 30 determines the start address of the block #6 and the start address of the block #10 by referring to the program block table shown in FIG. 6 according to the modification request. As described above, the controller 30 sums the sizes of the programs of the blocks #1 to #5 to determine the start address of the block #6. The sizes of the programs of the blocks #1 to #9 are summed by the controller 30 to determine the start address of the block #10.

The controller 30 refers to the start address of the block #6 and the start address of the block #10, respectively, to fetch the scan program stored in the block #6 and the interrupt program stored in the block #10. The controller 30 transmits the fetched PLC programs to the client device 34_1 and the client device 34_2, respectively.

The controller 30 receives the first modified scan program and the block number and size of the first modified scan program from the client device 34_1, and at the same time, the controller 30 receives the second modified interrupt program and the block number and size of the second modified interrupt program from the client device 34_2. When the controller 30 receives the first and second modified PLC programs from the client device 34_1 and the client device 34_2 at different timings, the above-described single modified program storing process may be sequentially performed.

Next, the controller 30 updates the modified scan program size of the #6 block and the modified interrupt program size of the #10 block, as shown in FIG. 7.

Next, the controller 30 refers to the program block table shown in FIG. 7 to determine the start addresses of the #6 block and #10 block in which the second and first modified PLC programs are to be stored, respectively.

More specifically, the controller 30 sums the sizes of all programs stored in the previous blocks to the modified PLC program block to determine the start address of the storage location where the modified scan program is to be stored. For example, the controller 30 sums the sizes (0x0000, 0x0100, and 0x0E00) of PLC programs stored in previous blocks to the modified scan program block #6, that is, the blocks #1 to #5, to determine the start address of the block #6 at which the modified scan program is to be stored.

Further, the controller 30 increases a start address of a next block to the second modified PLC program with a block number smaller than the block number of the first modified PLC program by sizes of the programs stored between the second modified PLC program and the first modified PLC program, to determine the start address of the block #10 as the block number of the first modified PLC program.

For example, the controller 30 first determines the start address of the next block (block #7) to the modified scan program #6 with a block number smaller than that of the modified interrupt program #10. As described above, the controller 30 increases the start address of the storage location where the modified scan program is to be stored, that is, the start address of the block #6, by the modified scan program size (0x0200), to determine the start address of the next block to the modified PLC program block, that is, the start address of block #7.

The controller 30 may determine the start address of the block #10 by increasing the determined start address of the block #7 by a sum of the sizes (0x0100, 0x1E10) of the programs stored in the blocks #7 to #9 as located between the modified scan program #10 and the modified interrupt program #6 with a block number smaller than the block number of the modified interrupt program #10.

Further, the controller 30 may determine the start address of the block #11 by increasing the start address of the block #10 by the size (0x0150) of the modified interrupt program.

The controller 30 concurrently stores the modified scan program and the modified interrupt program in the storage 32 with referring to the start address of the #6 block and the start address of the #10 block as determined via the above process.

In one example, prior to storing the modified scan program and the modified interrupt program in the storage 32, the controller 30 may back up in advance in the storage 32, other PLC programs as unmodified, that is, PLC programs stored in blocks #1 to #5, blocks #7 to #9, and blocks #11 to $14.

After storing the modified scan program and the modified interrupt program in the storage 32, the controller 30 may again store in the storage 32, the other PLC programs as unmodified, that is, the PLC programs stored in blocks #1 to #5, blocks #7 to #9, and blocks #11 to #14 with reference to the start address of the block #6, the start address of the block #7, the start address of the block #10, and the start address of the block #11, all of which are determined.

According to the prior art, in fetching each PLC program stored in the storage or storing the modified PLC program, the PLC directly checks the start address of the location where each PLC program is stored, from the program block table. However, the PLC program processing device according to the present disclosure directly computes the start address of the location where each PLC program is stored with referring to only the block number and program size included in the program block table.

Therefore, using the PLC program processing device according to the present disclosure may be advantageous in that several users may modify the PLC program at the same time.

The foregoing disclosure is subject to various substitutions, modifications, and alterations by those skilled in the art to which the present disclosure belongs, without departing from the technical idea of the present disclosure. Therefore, the present disclosure is not limited to the above-described embodiment and the accompanying drawings.

What is claimed is:

1. A device for processing a programmable logic controller (PLC) program, the device comprising:
a storage including a memory, wherein the storage is configured to store PLC programs stored on a block basis, and a program block table defining physical storage locations of the PLC programs; and
a controller including a hardware main processing unit (MPU), wherein the controller is configured to execute the PLC programs stored in the storage, wherein the controller is configured:
when a PLC program is modified while a PLC is operating,
to determine a start address of a physical storage location where the modified PLC program is to be stored with referring to a block number of the modified PLC program, size information of the modified PLC program, and the program block table, wherein the modified PLC program includes first and second modified PLC programs, wherein a block number of the first modified PLC program is greater than a block number of the second modified PLC program, wherein a start address of a physical storage location where the first modified PLC program is to be stored is determined by increasing a start address of a physical storage location where the second modified PLC program is to be stored, by a sum of sizes of PLC programs corresponding to block numbers between the block number of the second modified PLC program and the block number of the first modified PLC program; and
to store the modified PLC program in the storage based on the determined start address.

2. The device of claim 1, wherein the program block table includes a block number corresponding to each PLC program and size information of each PLC program.

3. The device of claim 1, wherein the start address of the physical storage location where the modified PLC program is to be stored is determined by summing sizes of all of PLC programs stored in previous blocks to the modified PLC program block.

4. The device of claim 1, wherein when the controller receives the modified PLC program, the controller is configured to back up PLC programs having block numbers greater than a block number of the modified PLC program,
wherein after the modified PLC program has been stored, the controller is configured to re-store the backed-up PLC programs in the storage based on a start address of a next block to the modified PLC program block.

5. The device of claim 4, wherein the start address of the next block to the modified PLC program is determined by increasing the start address of the physical storage location where the modified PLC program is to be stored by a size of the modified PLC program.

6. A device for processing a programmable logic controller (PLC) program, the device comprising:
a storage including a memory, wherein the storage is configured to store PLC programs stored on a block basis, and a program block table defining physical storage locations of the PLC programs; and
a controller including a hardware main processing unit (MPU), wherein the controller is configured to execute the PLC programs stored in the storage, wherein the controller is configured:
when a PLC program is modified while a PLC is operating,
to determine a start address of a physical storage location where the modified PLC program is to be stored with referring to a block number of the modified PLC program, size information of the modified PLC program, and the program block table; and
to store the modified PLC program in the storage based on the determined start address, wherein the modified PLC program includes first and second modified PLC programs, and a start address of a physical storage location where the first modified PLC program is to be stored is determined by increasing a start address of a physical storage location where the second modified PLC program is to be stored,
wherein when the controller receives the modified PLC program, the controller is configured to back up PLC programs having block numbers greater than a block number of the modified PLC program,
wherein after the modified PLC program has been stored, the controller is configured to re-store the backed-up PLC programs in the storage based on a start address of a next block to the modified PLC program block.

7. The device of claim 6, wherein the start address of the next block to the modified PLC program is determined by increasing the start address of the physical storage location where the modified PLC program is to be stored by a size of the modified PLC program.

* * * * *